United States Patent [19]

Nininger, Jr.

[11] 4,041,788
[45] Aug. 16, 1977

[54] ELECTRICAL CONTROL FOR DERAILLEUR DRIVE

[75] Inventor: Nathan Vivien Nininger, Jr., Manhattan Beach, Calif.

[73] Assignee: California Progressive Products, Inc., El Toro, Calif.

[21] Appl. No.: 600,303

[22] Filed: July 30, 1975

[51] Int. Cl.² ............................................. F16H 7/22
[52] U.S. Cl. .................................... 74/217 B; 74/242
[58] Field of Search ............. 74/217 B, 242; 280/236, 280/261

[56] References Cited

U.S. PATENT DOCUMENTS

| 3,863,512 | 2/1975 | Crawley | 74/217 B |
| 3,919,891 | 11/1975 | Stuhlmuller et al. | 74/217 B |

*Primary Examiner*—Samuel Scott
*Assistant Examiner*—A. Russell Burke
*Attorney, Agent, or Firm*—Alfred W. Kozak

[57] ABSTRACT

A control system for a chain carrier-idler assembly which positions and controls the drive chain shifting from one drive sprocket to another drive sprocket of the multiple sprocket cluster of a derailleur drive rear bicycle wheel mechanism. A chain carrier-idler assembly has its inboard or outboard motion controlled by the positioning of a "floating" gear from a neutral position to an inboard-drive or outboard-drive position. A movable lever arm (driven by a DC motor) carries the floating gear, and also carries a series of electrical contacts which connect and disconnect with contacts on a baseplate parallel to the lever arm, thus to energize or de-energize the motor. Another movable contact (representative of the position of the carrier assembly and drive chain) moves across a series of spaced fixed contacts representative of the location of each sprocket gear. A power source, rocker switch, and connecting circuitry are provided to upshift or downshift the drive chain. The cooperation of the fixed and movable electrical contacts with the drive motor and placement of the floating gear operate to adjust the duration of movement of the carrier assembly to the point where the new sprocket ratio is effectuated, at which moment the floating gear is driven back to neutral. Thus the gear-change operation is stopped automatically upon shift completion. The operator does not have to look or guess when to shut off the gear changing operation.

8 Claims, 9 Drawing Figures

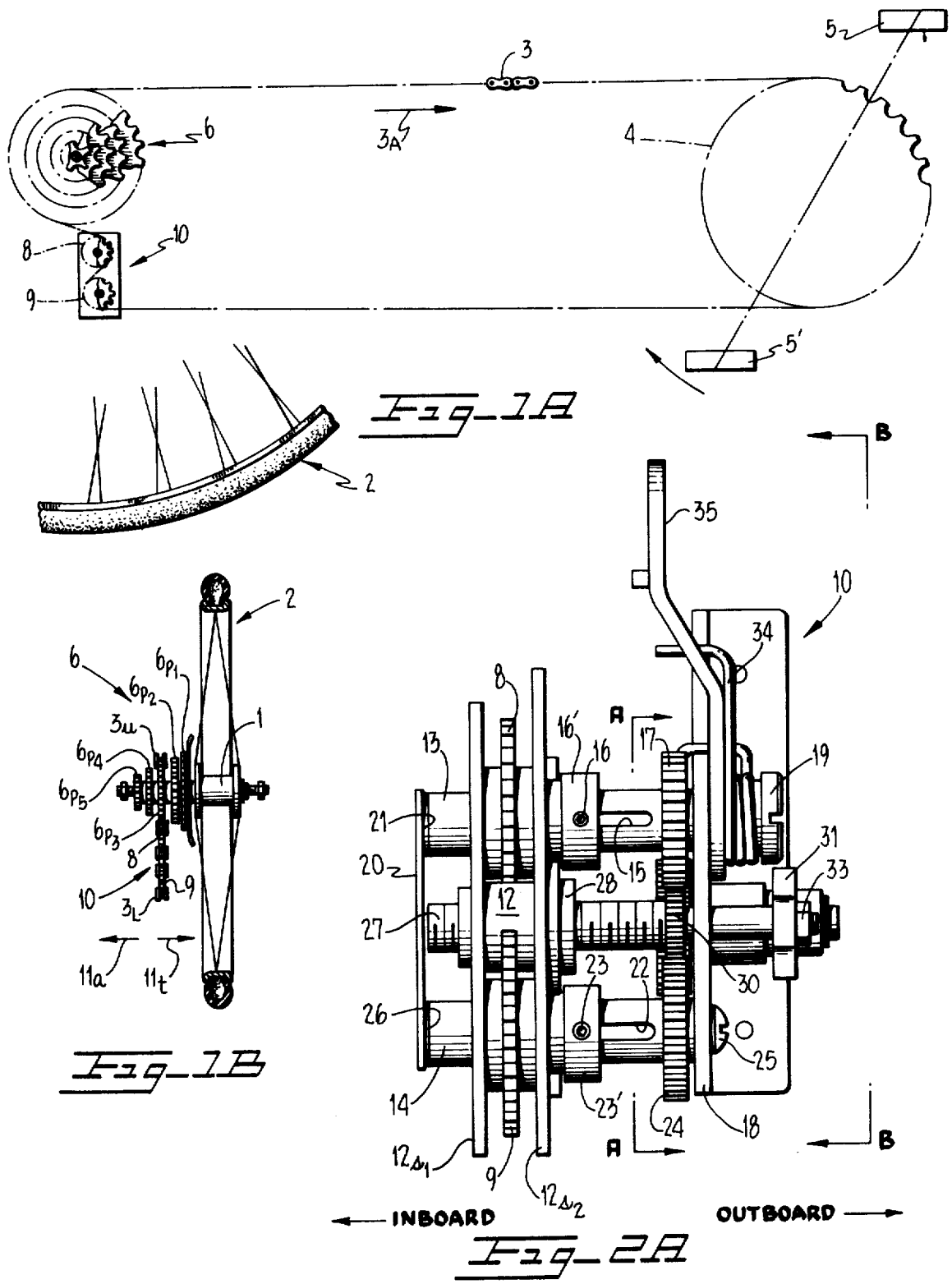

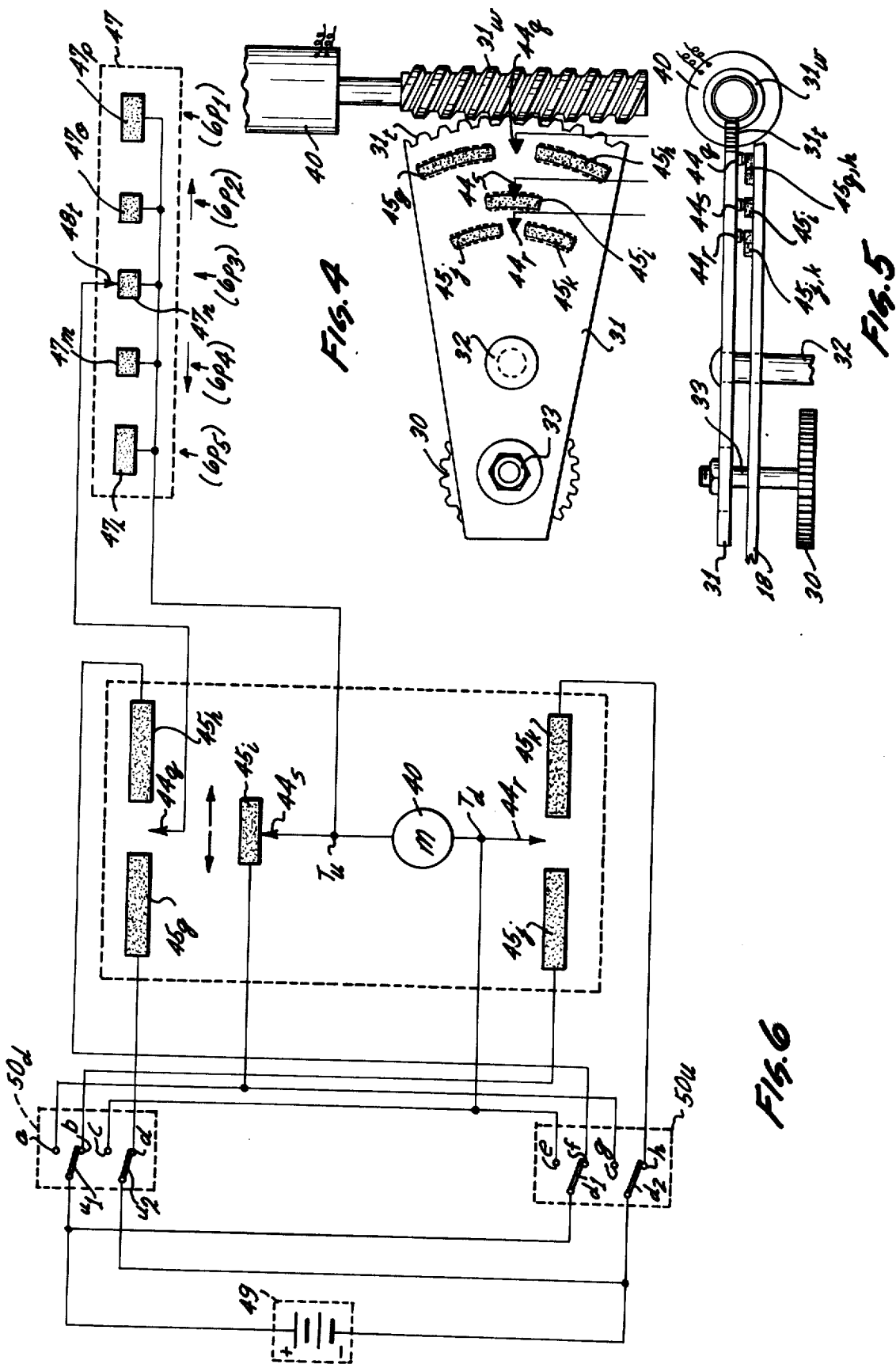

ELECTRICAL CONTROL FOR DERAILLEUR DRIVE

CROSS REFERENCES TO RELATED APPLICATIONS

This invention relates to an application entitled SHIFT MECHANISM FOR DERAILLEUR DRIVE, which issued on Feb. 4, 1975 as U.S. Pat. No. 3,863,512 by James W. Crawley, and assigned to the same assignee as the instant application.

BACKGROUND

In recent years, with the growing popularity of the bicycle, there has come to be a greater demand for and usage of bicycles operating on the variable ratio power drive principle commonly called the derailleur drive. Basically, this principle allows for changing the ratio of sprocket gears as between the forward drive sprocket (operated by foot pedal power) and the rear multiple cluster of sprocket gears laterally placed one to the other with a variety of diameters. A mechanism is provided whereby the drive chain may be derailed at the rear cluster from one sprocket gear to the next. Some of these systems also provide for sprocket gear change at the forward sprocket.

These bicycle derailleur gear shifting mechanisms in the prior art have presented a series of problems in actual operation such as the following:

1. The inability of the operator to position the bicycle drive chain precisely in line with a selected sprocket gear of the rear sprocket cluster for the purpose of derailing the drive chain to the selected sprocket when effecting a gear change.

2. The inability of the operator to recognize whether or not the bicycle drive is accurately positioned after the gear change is effected, as there still may be some offset.

3. The awkward and potentially dangerous utilization of auxiliary gear shifting levers which are generally located remote from the handlebar grips and which require the operator to release his hold on the handlebar grip steering mechanism in order to operate the gear-shifting lever.

The mechanism of the present invention overcomes the problems posed by prior art devices and the problems enumerated above. The gear-shifting apparatus disclosed herein provides for more positive, more precise, and more effective control of the derailing and shifting of the bicycle drive chain by either mechanical, electromechanical, hydraulic or other means. For example, electromechanical control can enable finger-tip push-button gear changing without necessitating the removal of either hand from the handlebar (as in the prior art) to shift a gear shift lever located remotely from the handlebar grip. Further, this mechanism is an improvement over that described in the aforementioned U.S. Pat. No. 3,863,512 in that no operator judgement is necessary as to when to terminate the shifting operation. When the gear-ratio shift has been accomplished, the electrical contact sensors and the control circuitry automatically shut off the shift operation. The operator has merely to depress one end (or the other) of a rocker switch to initiate the shift and nothing more, as the shut-off occurs automatically.

The disclosure of the present invention describes an idler assembly mechanism for attachment adjacent to the rear multiple sprocket gear cluster wherein simple positive means are provided for shifting the drive chain from any sprocket gear to any other desired sprocket gear quickly, positively and without offset or uncertainty. The described idler assembly mechanism is a unit within itself having an activating means which may be activated through electrical switches which are controlled by the operator near the steering mechanism, that is, the handlebars adjacent the operator's fingertips.

SUMMARY OF THE INVENTION

In view of the problems and deficiencies of bicycle gear changing presented by the prior art, the present invention provides a simple, easy to assemble, and inexpensive apparatus for the positive and easy change of derailleur gears in a bicycle power drive system.

Briefly, there is provided an idler assembly unit attachable adjacent and below the multiple gear cluster wherein a movable carrier supports upper and lower idler sprocket gears in an idler assembly unit. The upper and lower idler sprocket gears are supported by upper and lower rods each of which has an upper and lower gear on the outboard end of the rods and wherein the turning of the idler sprocket gears will turn the respective upper and lower gears.

The movable carrier is provided with a threaded sleeve which mounts around a threaded Leadscrew such that, if the Leadscrew turns, it will cause the carrier (and its associated idler sprockets) to move in a direction determined by the direction of rotation of the Leadscrew. The Leadscrew is provided with a drive gear also at the outboard end, which gear is normally not connected to any source of power or motion. Mounted between the upper and lower gears and enmeshed with the Leadscrew drive gear, is a floating central gear which is mounted on a movable lever arm on the outboard side of the idler assembly. This lever arm can be actuated (by means of mechanical, electrical, hydraulic, or other power) to engage either the upper or the lower gears which are driven by the upper or lower idler sprockets through the rotatable support rods. Engagement of the central floating gear with the upper gear will cause turning of the Leadscrew such that the carrier is driven inboard toward the rear wheel which will control the derailing of the drive chain inwardly toward the rear wheel. Contrariwise, should the central floating gear connect the lower gear to the drive gear of the Leadscrew, then the carrier motion is in the opposite direction, that is, away from the rear wheel in the outboard direction; and the control effect is to derail the drive chain outboard toward a smaller diameter sprocket gear of the multiple cluster.

The lever arm, which moves the "floating" gear into an "upper", "neutral", or "lower" position, is actuated by a worm gear driven by a small battery-actuated motor. A flatted portion of the lever arm carries a series of electrical contacts which can cooperate with elongated conductors on an adjacent baseplate to provide electrical information regarding the angular position of the lever arm.

Similarly, the movable carrier assembly unit carries a contact arm which moves along a linear series of electrical contacts residing on a support plate in order to electrically sense the linear position of the carrier assembly unit. When a desired gear-ratio change has been effectuated, there is an automatic stopping of the gear shifting operation by reason of electrical contacts cooperating with control circuitry causing the floating gear to return to neutral position.

The electrical sensors connect to a set of control switches, a battery power source, a DC motor, and circuitry which serve to provide for control over the derailleur drive chain so as to increase or decrease the gear driving ratio as desired by the operator.

Thus, it is possible, by the mere activation of one or another of a set of control switches to derail the drive chain in an outboard direction in order to connect a different gear ratio on the drive chain. Further, the electrical sensing contacts, by electrically de-activating the lever arm to the neutral or float position, cause all further derailing action to be stopped and the carrier with its idler sprockets and drive chain will remain in fixed position in the desired ratio condition.

BRIEF DESCRIPTION OF THE DRAWINGS

FIG. 1A is a schematic drawing of the power driving linkage of a derailleur bicycle system indicating the foot pedal force empowering the front sprocket and the drive chain connecting the rear multiple gear cluster and the idler assembly beneath it.

FIG. 1B is a cross-sectional view of the rear wheel of the bicycle system showing in greater detail the multiple gear sprocket cluster and the idler sprocket gears of the idler assembly underneath.

FIG. 2A is a detailed view in elevation of the component items making up the idler assembly unit.

FIG. 4 is a side view of the pivotable lever arm with schematic representation of its electrical contacts and dotted representations of the elongated conductors on the baseplate underneath.

FIG. 5 is a plan view of the pivotable lever arm and the adjacent baseplate with its cooperating electrical contacts.

FIG. 6 is a schematic circuit diagram showing how the battery power source and the derailleur control switches cooperate with the lever arm contacts and the carrier assembly position sensors.

DESCRIPTION OF THE PREFERRED EMBODIMENT

Figure 2B:
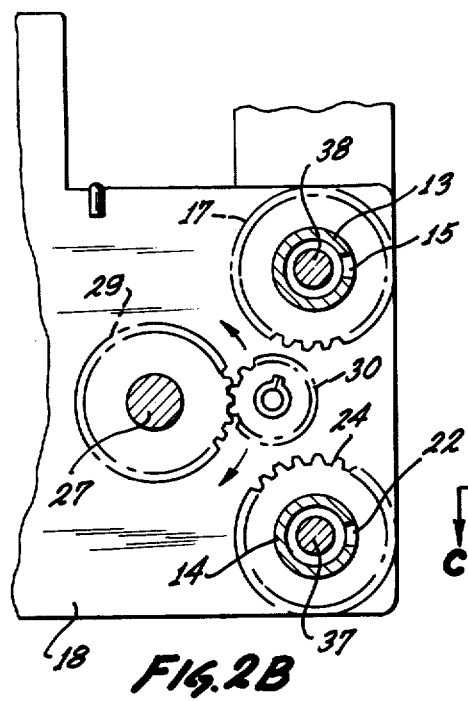
FIG. 2B is a cross-section cutout view of a portion of the idler assembly taken along the line A—A.

With reference to FIG. 1A, there is shown the power delivery train for a derailleur type bicycle gear shifting mechanism. Foot pedals 5 and 5' are used to turn the forward drive sprocket gear 4 which drives the drive chain 3 in the direction indicated by arrow 3A. The drive chain 3 (upper portion) rides on a smaller sprocket gear on the rear sprocket gear cluster 6. It rides over upper idler sprocket gear 8 and lower idler Sprocket gear 9 which are mounted on the idler assembly unit 10, after which the drive chain 3 connects to the lower side of the forward drive sprocket 4.

Looking from the front of a bicycle toward the rear wheel, FIG. 1B shows the rear wheel 2 having an axle 1 and onto which is mounted the gear cluster 6 having five rear sprocket gears emplaced laterally and shown as elements $6_{p1}$, $6_{p2}$, $6_{p3}$, $6_{p4}$, and $6_{p5}$. The drive chain 3 is shown in FIG. 1B in its upper portion at $3_u$ and at its lower portion at $3_L$. Adjacently below the rear sprocket gear $6_p$ is a portion of the idler assembly unit 10 showing the upper idler gear sprocket 8 and the lower idler gear sprocket 9. Arrow 11a indicates the direction of outboard motion (away from the rear wheel) while arrow $11_t$ shows the direction of inboard motion toward the rear wheel.

The entire idler assembly unit 10 is shown in FIG. 2A wherein the upper and lower idler sprocket gears 8 and 9 are mounted on rods 13 (upper) and 14 (lower), respectively. The upper and lower rods 13 and 14 are supported between the outboard idler assembly plate 18 and the inboard assembly plate 20. Upper bearing 21 and lower bearing 26 support the inboard ends of rods 13 and 14.

The upper rod 13 and lower rod 14, respectively, have horizontal slots 15 and 22. Riding on rods 13 and 14 are upper and lower sleeves 16' and 23', respectively. These sleeves are held in position by pins 16 and 23 which are inserted through slots 15 and 22 so that the sleeves may slide or move along the length of the rods.

The upper and lower sleeves 16' and 23' are part of carrier unit 12 which is a movable mechanism supporting the upper and lower idler sprocket gears 8 and 9. Also attached to and part of the carrier unit 12 is a threaded sleeve 28 which mounts upon a central Leadscrew 27. The Leadscrew 27 is a threaded bolt inserted in the sleeve 28 and which Leadscrew bolt is mounted on the outboard idler assembly plate 18. The outboard end of the Leadscrew 27 is provided with a drive gear 29 (see FIG. 3B), which gear 29 rides in engagement with a floating central gear 30.

The carrier unit 12 has respective inboard and outboard sideplates $12_{s1}$ and $12_{s2}$.

Figure 3A:
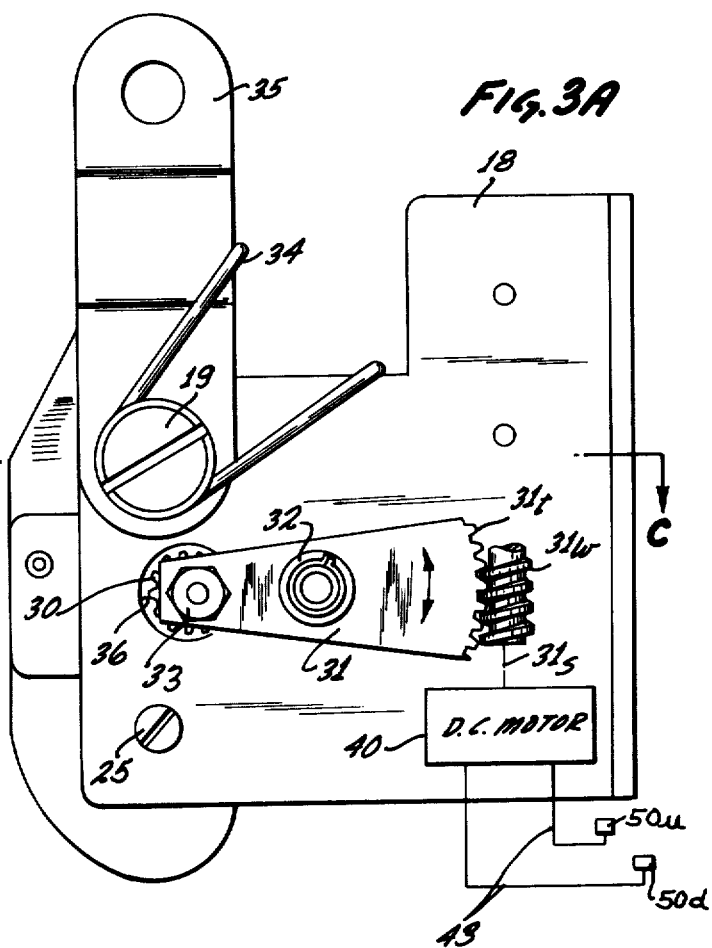
FIG. 3A is a view, in elevation, of one side of the idler assembly (outboard side) illustrating the mounting of the central floating gear on a movable lever arm. (This is taken along line B—B of FIG. 2A.)

The floating gear 30 is supported by a mounting 33 which is held by one end of a lever arm 31 (also shown in FIG. 3A).

Screw 25 holds lower rod support 37 (see FIG. 2B) to the outboard idler assembly plate 18.

Screw 19 holds upper rod support 38 (see FIG. 2B) and also serves to hold spring 34 (FIG. 2A) which helps to provide proper tension to the idler assembly and idler sprocket gears (upper and lower) so as to provide adequate tension to hold the drive chain 3 against the idler sprocket gears 8 and 9.

A cross-sectional cutout, looking outboard (along section AA of FIG. 2A) is shown in detail in FIG. 2B. Referring to FIG. 2B, the outboard idler assembly plate 18 supports the upper and lower gears 17 and 24, in addition to supporting the Leadscrew drive gear 29 which is set to continuously engage the floating gear 30. Also seen in FIG. 2B are upper and lower rods 13 and 14 having their respective slots 15 and 22. Rod supports 38 and 37 are seen mounted through the upper and lower rods 13 and 14. The Leadscrew 27 is shown connected to the drive gear 29 which engages the floating gear 30.

Referring to FIG. 3A, there is seen a side view, in elevation, of the outboard idler assembly plate 18. This is taken from section BB of FIG. 2A. A pivot bearing 32 mounts a lever arm 31 on one end of which is a mounting 33 which holds the floating gear 30. A cutout 36 on plate 18 permits the lever arm 31 to position the floating gear 30 from its normal neutral position into an elevated or depressed condition where it may connect either to upper gear 17 or lower gear 24. Lever arm 31 may be provided with gear teeth $31_t$ which can be driven by electric motor means. Alternatively, lever arm 31 may be actuated by mechanical, hydraulic or other means.

FIG. 3A indicates a worm gear $31_w$ for driving the teeth $31_t$ of lever arm 31. A shaft $31_s$ connects the worm gear to a DC motor 40 which has wires 43 connected to button switches 41 and 42 (located preferably on the bicycle handlebars adjacent the fingers of the operator). The button switches $50_u$, $50_d$, when actuated, serve to drive the worm gear $31_w$ in one direction or the reverse, depending on which button switch is pressed. Thus the central floating gear 30 may be raised or lowered.

In this view of FIG. 3A, the outboard side $12_{s2}$ of the carrier unit 12 is seen protruding behind the plate 18. Also, tension spring 34 is held by screw 19 and plate extension 35 is provided for mounting the idler assembly unit to the frame of the bicycle.

Figure 3B:
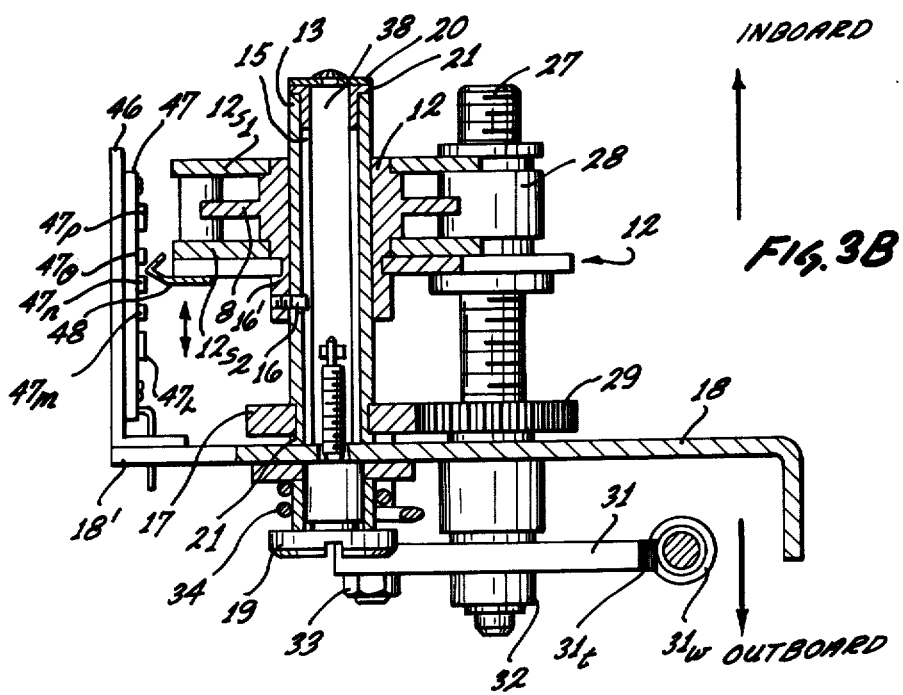
FIG. 3B is a plan view of the idler assembly unit illustrating how the carrier is driven by the Leadscrew and also showing the upper idler sprocket gear of the carrier. (This is taken along line C—C of FIG. 3A.)

Referring to FIG. 3B, there is seen a plan view of the idler assembly 10 by taking a cutout CC from FIG. 3A. With reference to FIG. 3B, there is seen the outboard plate 18, the Leadscrew 27 and its driving gear 29. Plate 18 also supports pivot bearing 32 which holds lever arm 31 having the mount 33 for the floating gear 30 (not seen here). Plate 18 also supports screw 19, upper rod support 38, and upper rod 13 (as well as lower rod 14, not seen here). Carrier unit 12 is shown with its inboard side $12_{sl}$ and its outboard side $12_{s2}$. Within the carrier unit 12 is seen the upper idler sprocket gear 8.

Upper carrier sleeve 16' is held in place by pin 16 and slides along slot 15. The outboard end of upper rod 13 is connected to upper gear 17. The inboard end of upper rod 13 is held by the bearing 21 and inboard plate 20.

Referring to FIG. 3B, the baseplate 18 has an extension plate 18' holding a support plate 46 which supports as insulator plate 47 mounting a series of electrical contacts $47_L$, $47_m$, $47_n$, $47_o$ and $47_p$.

The carrier unit 12 is provided with an extension rod 48 having an electrical carrier position contactor $48_t$ which connects to linear contacts $47_L$ to $47_p$ depending on the position of the carrier unit 12.

Referring to FIG. 4, there is seen a side view of the pivotable lever arm 31 which can be moved about pivot pin 32 and which supports the floating gear 30. The gear teeth $31_t$ connect to worm gear $31_w$ which is driven by motor 40 in one or the opposite direction according to the direction of voltage switched into the motor 40.

Referring to both FIGS. 4 and 5, there are three electrical contacts mounted on lever arm 31 and these are designated as $44_r$, $44_s$ and $44_q$. These contacts, which move with the pivoting of lever arm 31, make and break contact with the elongated contacts $45_j$, $45_k$, $45_i$, $45_g$ and $45_h$ which are fixedly mounted on baseplate 18.

In FIG. 6 is shown an electrical schematic drawing indicating the electrical control system used in conjunction with the movable carrier 12 and the pivotable lever arm 31 together with the electrical contacts which co-operate with these units.

The carrier unit position contact $48_t$ is seen at the upper right corner in electrical connection with contact $47_n$, but is to be understood as movable so as to be able to contact contacts $47_L$ through $47_p$ according to the position of the carrier unit 12.

Likewise, the movable contacts $44_r$, $44_s$ and $44_q$ (of the pivotable lever arm 31) are seen in a central position but are capable of being moved to contact various of the elongated contacts $45_g$, $45_h$, or $45_i$ or $45_j$ and $45_k$. The DC motor 40 has its terminals $T_u$ and $T_d$ connected to various of the contacts shown.

A battery power source 49 connects through control switches $50_u$ and $50_d$ to connect power to the motor 40 through the movable contacts. The switches $50_u$ and $50_d$ are shown in their normal positions when not activated. When either of these switches is activated, the poles $u_1$, $u_2$ and $d_1$, $d_2$ will connect to the opposite switch terminal from that shown in FIG. 6.

OPERATION

Referring to FIG. 1A, motive power is applied to foot pedals 5 and 5' through the agency of a bicycle rider, thus turning sprocket 4 in the clockwise direction, along with the sprocket chain 3.

Sprocket chain 3 connects to the idler assembly unit 10 where it turns idler sprocket 9 clockwise and upper idler sprocket 8 counterclockwise. The chain 3 then connects to one of the rear sprockets as, for example, sprocket $6_{p3}$ (of FIG. 1B), which is connected to axle 1.

Sprocket $6_{p3}$ is driven clockwise and causes rear wheel 2 to also be driven clockwise providing forward motion to the vehicle or bicycle.

Referring to FIG. 3A, the lever arm 31 is seen residing in its neutral or float position, which means that the floating gear 30 (better seen in FIG. 2B) makes no connection to gears 17 and 24 but merely stays in contact with Leadscrew drive gear 29. This represents a condition of stasis or no-change in regard to the gear ratios used to drive the rear wheel 2.

Lever arm 31 is, however, movable about pivot 32 (FIG. 3A) by means of force which can be applied at the lever arm teeth area $31_t$. For example, a miniature DC motor 40 with output worm gear $31_w$ may be connected to the lever arm gear teeth $31_t$ and such miniature motor may be switched so as to drive teeth $31_t$ in the upward or the downward direction. Alternatively, the teeth $31_t$ or the lever arm 31 itself may be actuated by a wire cable, a hydraulic device or other actuating means. The control for any of these actuating devices would be accomplished by control means located adjacent the rider's hands in a convenient position, causing minimum disturbance to the rider's control of the steering and without significant distraction of his forward view.

In FIG. 3A the lever arm teeth $31_t$ are shown connected to worm gear $31_w$ which is driven by miniature motor 40. Actuation switches $50_u$ and $50_d$ connect to motor 40 via wires 43 to control motion in the desired inboard (lower gear ratio) or outboard (higher gear ratio) direction.

Should the rider desire to shift to a lower gear ratio, as for climbing a steeper grade, he would operate his actuation means to, for example, cause the lever arm 31 to move downward at $31_n$, thus causing the floating gear 30 to move upward, thus making gear 17 (FIG. 2B) connect with Leadscrew gear 29. Now since the idler sprocket 8 is being driven by the drive chain 3, and the sprocket 8 is continuously turning its end gear 17, then gear 17 transmits rotary power to the Leadscrew drive gear 29 to cause the carriage 12 to move inboard toward sprocket $6_{p2}$ (FIG. 1B).

Since carriage 12 and its idler sprockets 8 and 9 carry the drive chain 3, then drive chain 3 is carried over into engagement with the rear sprocket $6_{p2}$, at which time the lever arm 31 is returned to its neutral or float position so that no more lateral drive motion is transmitted to the carriage 12 of the rear idler assembly 10.

Likewise, should the rider desire a higher drive ratio as on a long flat straightaway, he would actuate lever arm teeth $31_t$ in the upward direction which would move floating gear 30 downward and cause power engagement between the lower gear 24 (FIG. 2B) and the Leadscrew gear 29. In this case, the carriage 12 would be driven in the outboard direction taking the drive chain 3 over into engagement with a smaller rear sprocket such as $6_{p4}$ (FIG. 1B) after which lever arm 31 and floating gear 30 would again be returned to the neutral or float position.

Thus, the rider or operator, by means of his remote actuation means, can control the position of lever arm 31 and floating gear 30 to cause the drive chain 3 to be moved toward the inboard or outboard direction until a new rear drive sprocket is engaged, after which he can return the floating gear 30 to the neutral or non-shift position.

In the preferred embodiment, the electrical contact sensors of FIGS. 4 and 5 should now be understood as being added to the lever arm 31 and base plate 18 of FIG. 3A. Likewise the switches $50_u$ and $50_d$ and the control circuitry of FIG. 6 should now be understood as part of switches $50_u$, $50_d$ of FIG. 3A. Now referring to the electrical schematic drawing of FIG. 6, it should be understood that the power from the battery 49 (located on the bicycle) is only expanded to effectuate the movement of the lever arm 31 to move the floating gear 30 from its neutral position into engagement with either the upper gear 17 or the lower gear 24, and back to a neutral position. The actual power for derailling the chain is derived from the rider's action of moving the drive chain 3 via the pedals 5, 5' and drive sprocket 4.

The control switches $50_u$ (Up) and $50_d$ (Down) are shown in their unactivated state. These switches are preferably mutually exclusive such that only one can be depressed at a given moment. A rocker switch can be used to accomplish this function. The Up switch $50_u$ functions to cause the pedalling gear ratio to increase, that is, to derail the chain 3 outboard to drive a smaller drive-sprocket gear. The Down switch $50_d$, when activated, operates to derail the drive chain inboard causing the pedalling gear ratio to decrease by driving a larger size sprocket gear.

The position of the carrier unit 12 is regulated such as to position the drive chain in the following manner:

| Sliding contact 48 connects with: | Carrier unit position drive chain on sprocket: | |
|---|---|---|
| Contact $47_L$ | $6_{p5}$ | (Figure 1B) |
| Contact $47_m$ | $6_{p4}$ | |
| Contact $47_n$ | $6_{p3}$ | |
| Contact $47_o$ | $6_{p2}$ | |
| Contact $47_p$ | $6_{p1}$ | |

In FIG. 6, the purpose of the control circuitry is to apply the proper polarity of voltage at various times to the motor 40 so as to actuate the floating gear 30 into and out of engagement with the upper gear 17 or the lower gear 24, as previously described.

The operation sequences to be described will be as follows:
I. Actuation of the Down switch $50_d$ to cause derailling of drive chain to the next larger rear sprocket, to decrease the pedalling gear ratio.
II. Actuation of the Up switch $50_u$ to cause derailling of the drive chain to the next smaller rear sprocket, to increase the pedalling gear ratio.
III. Activation of Down switch $50_d$ to cause derailling of drive chain toward larger sprockets, where the Down switch is activated for a duration of time long enough to accomplish chain displacement of more than one sprocket.
IV. Activation of the Up switch $50_u$ to cause the derailling of drive chain toward smaller sprockets, where the Up switch is activated long enough to accomplish chain displacement of more than one sprocket.

I. DERAILLING TO NEXT LARGER SPROCKET (INBOARD MOTION)

Referring again to FIG. 6, the switches $50_u$ and $50_d$ are seen in their unactivated state. The position of sliding contact $48_t$ indicates that the drive chain 3 is utilizing rear sprocket $6_{p3}$. Since contact $44_r$ and terminal e have no voltage connection, the motor 40 is inactive.

To initiate action to the next larger sprocket inboard, the Down switch $50_d$ is depressed. Positive battery voltage is applied through $u_1$ to terminal a to $45_i$ and $44_s$ to terminal $T_u$ of motor 40. Negative voltage is also now applied through $u_2$ through terminal c to motor terminal $T_d$ to cause motor 40 to turn worm gear $31_w$ causing lever arm 31 to pivot so as to move floating gear 30 into engagement with upper gear 17. As lever arm 31 moves, the sliding contact $44_q$ moves into contact with $45_g$, the sliding contact $44_r$ moves into contact with $45_j$, and sliding contact $44_s$ moves out of contact with $45_i$ to disconnect the positive voltage from motor terminal $T_u$ to stop the motor.

At this moment, lever arm 31 has moved floating gear 30 into full engagement with upper gear 17.

Since the upper gear 17 is rotating by virtue of the drive chain movement, the floating gear 30, the drive gear 29, and the Leadscrew 27 will be caused to rotate causing an inboard movement of carrier unit 12. The inboard movement of carrier assembly unit 12 will cause sliding contact $48_t$ to move so as to break contact with $47_n$. When this contact is broken, the Down switch $50_d$ can be released and the positioning action of the drive chain will continue as the bicycle rider continues to pedal.

It should be noted that no battery power has been expended since contact $44_s$ moved out of touch with $45_i$. Now, although the Down switch $50_d$ has been released, no voltage is applied to motor 40, but the lever arm 31 is still displaced so that floating gear 30 is still in contact with upper gear 17 so that the inboard movement of carrier 12 and movement of contact $48_t$ is still taking place, as the drive chain moves.

this action progresses until the drive chain has been positioned precisely on sprocket $6_{p2}$ (from $6_{p3}$), since at this moment, sliding contact $48_t$ comes into contact with electrical contact $47_o$. When this occurs, negative voltage is applied to terminal $T_u$ of motor 40 from the normally closed contact $u_2$ and terminal d to conductor $45_g$ through sliding contacts $44_q$ and $48_t$ to conductor $47_o$ and thence to motor terminal $T_u$.

Also, positive voltage is applied to motor terminal $T_d$ from the normally closed contact $u_1$ and terminal b, conductor $45_j$, slider $44_r$, to motor terminal $T_d$.

The voltage now applied to the motor will cause it to rotate in the opposite sense causing lever arm 30 to retract to its horizontal position so that floating gear 30 will move out of engagement with upper gear 17 to the neutral position shown in FIG. 4. The disengagement of floating gear 30 and upper gear 17 will stop the inboard movement of carrier unit 12 at the spot precisely defined by sliding contact $48_t$ and conductor $47_o$.

Thus when lever arm 30 has moved sufficiently for sliding contact $44_q$ to lose contact with $45_g$, for $44_r$ to lose contact with conductor $45_j$, and for sliding contact $44_s$ to make contact with conductor $45_i$, the floating gear 30 is fully out of engagement and all carrier assembly inboard movement ceases. At this time, the drive chain is utilizing sprocket $6_{p2}$ and will continue to do so until another control switch is activated to command a change.

II. DERAILLING TO NEXT SMALLER SPROCKET (OUTBOARD MOTION)

Referring again to FIG. 6, the electrical control system is in a quiescent state with both switches $50_u$ and $50_d$ being unactivated and no voltage is applied across motor 40. The position of sliding contact $48_t$ indicates that the drive chain is positioned over and is utilizing rear drive sprocket $6_{p3}$.

To initiate the derailling action to the next smaller sprocket, the Up switch $50_u$ is depressed and held. As seen in FIG. 6, negative battery voltage is then applied through switch terminals $d_2$ and g to conductor $45_i$ to sliding contact $44_s$ to motor terminal $T_u$. Likewise, at the same time, positive battery voltage is applied through switch terminals $d_1$ and e over to the lower motor terminal $T_d$. The motor 40 will now operate to turn worm $31_w$ causing lever arm 31 to pivot in such manner as to make floating gear 30 move into engagement with lower gear 24 (best seen in FIG. 2B).

As lever arm 31 is pivoting, its attached sliding contacts $44_q$, $44_s$, and $44_r$ also move such that sliding contact $44_q$ moves toward conductor $45_h$, sliding contact $44_r$ moves toward conductor $45_k$, and sliding contact $44_s$ moves toward the right edge of conductor $45_i$ (FIG. 6).

As the switch $50_u$ is kept depressed, the lever arm 31 continues to rotate and slider $44_q$ moves into contact with conductor $45_h$, slider $44_r$ moves into contact with conductor $45_k$, and slider $44_s$ moves out of contact with $45_i$. Disconnection of $45_i$ from $44_s$ removes negative voltage from terminal $T_u$ and motor 40 even though the switch $50_u$ is kept depressed.

At this point in time, floating gear 30 is in full engagement with lower gear 24. Now since lower gear 24 is rotating due to drive chain movement in a direction opposite to that of upper gear 17, this will cause rotation of floating gear 30, of drive gear 29, and of Leadscrew 27, thus causing the outboard movement of carrier assembly 12.

This outboard movement of carrier assembly 12 makes sliding contact $48_t$ move out of contact with $47_n$. At this point the switch $50_u$ may be released, but the positioning action will continue automatically as the pedals and drive chain are operated by the rider. Again it should be noted that, although the switch $50_u$ has been released, no voltage is applied to motor 40, but the floating gear 30 is still in engagement with lower gear 24; and the outboard motion of carrier assembly 12 is still taking place, being empowered by the moving drive chain.

Thus the carrier assembly moves the drive chain from sprocket $6_{p3}$ to $6_{p4}$ and accomplishes the precise positioning because the sliding contact $48_t$ comes into contact with conductor $47_m$. When this contact occurs, voltage from the battery is applied to motor 40 in the opposite sense to that previously applied. Thus, positive voltage is applied to terminal $T_u$ of motor 40 from the normally closed switch terminal $d_1$ and f to conductor $45_h$, through sliding contact $44_q$ to sliding contact $48_t$, through conductor $47_m$ to motor terminal $T_u$. Then also, negative voltage is applied to bottom electrode $T_d$ of motor 40 via normally closed switch terminals $d_2$ and h to conductor $45_k$, through sliding contact $44_r$ to the lower motor terminal $T_d$. This opposite polarity applied to motor 40 will reverse the direction of worm $31_w$ and cause lever arm 31 to move back toward its horizontal or neutral position, thus making floating gear 30 move out of engagement with lower gear 24. This disengagement will stop the outboard movement of carrier assembly 12 at the position precisely defined by sliding contact $48_t$ and conductor $47_m$.

Thus when lever arm 31 has moved sufficiently for sliding contact $44_q$ to lose contact with $45_h$, and for sliding contact $44_r$ to lose contact with conductor $45_k$, and for contact $44_s$ to make contact with conductor $45_j$, then the floating gear 30 is fully out of engagement with lower gear 24 and all carrier assembly outboard movement ceases. The drive chain will now be utilizing sprocket $6_{p4}$ (FIG. 1B) and will continue to do so until another control switch command is delivered.

III. DERAILLING INBOARD TO MORE THAN THE NEXT LARGER SPROCKET

Previously described in Paragraph I was the sequence of the bicycle rider switching to shift to the next adjacent larger sprocket moving inboard. Now assuming that the rider wishes to shift inboard further than the next adjacent sprocket, that is to say, to shift past more than one sprocket over. In this case, the action is the same as previously described in Paragraph I except that the rider continues to depress the Down switch $50_d$ after the first deraillment, rather than releasing the switch $50_d$ at that time.

Thus, switch $50_d$ is depressed and held, the motor 40 will then cause floating gear 30 to engage upper gear 17. This will make sliding contact $44_q$ move toward conductor $45_g$, will make slider $44_r$ move toward conductor $45_j$ and $44_s$ will move toward the left edge (FIG. 6) of conductor $45_i$.

As switch $50_d$ is kept depressed, the lever arm 31 continues to rotate until sliding contact $44_s$ moves out of contact with conductor $45_i$, this action removing the positive voltage from terminal $T_u$ of the motor, even though switch $50_d$ is kept depressed.

As previously described in Paragraph I, the floating gear 30, the drive gear 29 and the Leadscrew 27 will be set in rotation, causing inboard movement of carrier assembly 12. Thus, sliding contact $48_t$ will move out of contact with conductor $47_n$. However, the switch $50_d$ must still be depressed until after this occurs (if the switch $50_d$ were released at this point, the deraillment would take place only to the next adjacent sprocket $6_{p2}$).

Now since the switch $50_d$ is still depressed, no voltage is applied to motor 40 and floating gear stays in engagement with upper gear 17, and the carrier assembly 12 continues its inboard motion until contact $48_t$ is moved out of contact with conductor $47_o$. At this point the switch $50_d$ may be released since the voltage on sliding contact $48_t$ will have no effect until contact $48_t$ touches conductor $47_p$.

When sliding contact $48_t$ makes contact with conductor $47_p$, voltage is applied to motor 40 in the opposite polarity to that previously applied and the motor will reverse direction to move the floating gear 30 out of engagement with upper gear 17 and all carrier assembly inboard movement ceases.

IV. DERAILLING OUTBOARD TO MORE THAN THE NEXT ADJACENT SPROCKET

In this case, the Up switch $50_u$ is used and the switch is kept depressed until after the first derailment has occurred. The action electrically is similar to that described in Paragraph II, except a prolonged depression of the switch $50_u$ is made.

In this case the action is the reverse of the motion described in Paragraph III in that the initial motion of the lever arm is in the opposite direction so as to engage the lower gear 24 instead of the upper gear 17.

Having described the control mechanism for derailleur shift control by the operator, I claim as follows:

1. In a derailleur gear changing system including a main drive sprocket, a plurality of rear sprocket gears, and a connecting drive chain, the combination comprising:
   a. means for laterally displacing said drive chain by means of power derived solely from the motion of said drive chain;
   b. control means to start the shifting of said chain displacing means, and to automatically shut off the shifting operation upon completion of a gear-ratio change.

2. The system of claim 1 wherein said control means includes: (b1) a battery, (b2) a motor, and (b3) electrical sensing means sensitive to the direction of and distance moved by said means for displacing said drive chain, said sensing means being operative to stop the lateral motion of said means for displacing said drive chain upon the proper displacement of said drive chain on the desired gear.

3. A control system for a derailleur gear shift mechanism having a main drive sprocket, a plurality of rear sprocket gears, a drive chain, and means for laterally displacing said drive chain, the combination comprising:
   a. a power source;
   b. a drive means activated by said power source;
   c. a carriage assembly for laterally positioning said drive chain;
   d. a floating gear, positionable by said drive means, to connect or disconnect motive power to said carriage assembly resulting in lateral motion or stopped motion of said carriage assembly, said floating gear having a first, a second, and a neutral position;
   e. a first sensing means to sense the lateral position of said carriage assembly;
   f. a second sensing means to sense the first, second or neutral position of said floating gear;
   g. control circuitry to initiate a gear shift by causing said floating gear to move from neutral position to said first or second position, and then disconnecting said power source, thus permitting motive power from said drive chain to laterally move said carriage assembly and to place said drive chain on the next adjacent rear sprocket gear after which said power source is connected to drive said floating gear to its neutral position.

4. The control system of claim 3 wherein power from said power source is used solely for changing the position of said floating gear from neutral to a first or second position, or from said first or second position back to the neutral position.

5. In a derailleur gear changing mechanism including a main drive sprocket, a plurality of rear sprocket gears, a carrier assembly with means for laterally shifting the drive chain with power solely derived from motion of the drive chain, a control system for changing the gear ratio comprising:
   a. floating gear positionable from a neutral position to a first or second position to cause said lateral shifting means to be driven toward the inboard or outboard direction;
   b. means for positioning said floating gear into the said first, second or neutral position;
   c. means to automatically control the duration of said floating gear in its first or second position before returning it to neutral position, said duration being terminated upon placement of said drive chain on the desired rear sprocket gear.

6. The control system of claim 5 wherein said means for positioning said floating gear includes:
   b1. a power source;
   b2. a directional starting switch;
   b3. a drive means;
   b4. a movable lever for holding said floating gear, said lever being moved in response to said drive means;
   b5. a first sensing means representative of the amount of motion imparted to said lateral shifting means, wherein after a proper amount of motion is delivered, the said first sensing means initiates reversal of said drive means to cause said movable lever to position said floating gear in neutral position, thus stopping any further motion of said lateral shifting means;
   b6. a second sensing means representative of the position of said floating gear, and operative to shut off said drive means after each position-change of said floating gear.

7. The control system of claim 6 wherein said first sensing means includes:
   b5.1. a plurality of fixed contacts representative of the position of each rear sprocket gear;
   b5.2. a movable contact representative of the position of the drive chain carried by said lateral shifting means;
   and wherein said second sensing means includes:
   b6.1. a first plurality of fixed electrical contacts mounted adjacent said movable lever;
   b6.2. a second plurality of contacts mounted on said movable lever.

8. In a derailleur mechanism providing for the capability of gear-ratio change, and constituting a main drive sprocket, a drive chain, a plurality of rear sprocket gears, and a carriage unit able to move said drive chain laterally when a positionable actuating gear is connected thereto, a control system for automatically stopping the lateral motion of said carriage unit and drive chain when the desired gear shift has been accomplished, the combination comprising:
   A1. an electrical power source;
   A2. A drive means powered by said power source;
   A3. a directional switch for starting a gear change cycle;
   a. means to laterally shift said drive chain with motive power derived solely from said drive chain;
   b. a positionable actuating gear positionable to cause said lateral shift means to move inboard or outboard;
   c. means for changing said positionable gear from one position to another, said changing means being driven by said drive means;

d. means for sensing the position of said positionable gear;

e. means for shutting off said drive means at the completion of each position change of said positionable gear;

f. means for reversing said drive means upon the completion of the gear shift, thus to stop lateral motion of said lateral shift means.

* * * * *